March 17, 1959 R. ADLER 2,878,414

TRAVELING-WAVE DEVICES

Filed Dec. 30, 1953 3 Sheets-Sheet 1

ROBERT ADLER
*INVENTOR.*

BY Francis W. Crotty

HIS ATTORNEY.

March 17, 1959 R. ADLER 2,878,414

TRAVELING-WAVE DEVICES

Filed Dec. 30, 1953 3 Sheets-Sheet 2

ROBERT ADLER
*INVENTOR.*

BY Francis W. Crotty

HIS ATTORNEY.

March 17, 1959 R. ADLER 2,878,414

TRAVELING-WAVE DEVICES

Filed Dec. 30, 1953 3 Sheets-Sheet 3

ROBERT ADLER
INVENTOR.

BY Francis W. Crotty

HIS ATTORNEY.

United States Patent Office
2,878,414
Patented Mar. 17, 1959

2,878,414

TRAVELING-WAVE DEVICES

Robert Adler, Northfield, Ill., assignor to Zenith Radio Corporation, a corporation of Delaware Application December 30, 1953, Serial No. 401,149
11 Claims. (Cl. 315—3.6)

This invention relates to new and improved electron-discharge devices of the traveling-wave type. More particularly, the invention is directed to traveling-wave tubes suitable for use as amplifiers over a relatively wide range of frequencies.

With the advent of television broadcasting at frequencies within the ultra-high-frequency range between 490 and 870 megacycles per second, manufacturers of television receivers have found it necessary to provide terminal equipment adapted to receive programs transmitted within this frequency range. One of the most difficult problems presented in the construction of such a receiver results from the fact that conventional intensity-control electron tubes (triodes, pentodes, etc.) are not well suited for use as amplifiers within the ultra-high-frequency range; more particularly, it is extremely difficult to achieve uniform gain throughout the U. H. F. range with tubes having practical dimensions. Accordingly, it has generally been considered preferable to apply the received signal directly to a heterodyning stage without preliminary radio-frequency amplification. In this event, however, the picture reproduced by the receiver is often seriously disturbed by thermal noise.

One known type of electron-discharge device which is capable of providing amplification over a relatively wide range of high frequencies is the conventional traveling-wave tube. In these tubes, a radio-frequency signal is applied to a low-velocity wave-transmission line, which, in its simplest form, may comprise a helically wound conductor. An electron stream is directed along a path closely adjacent to the helical line; usually, the electron beam path coincides with the axis of the helix. The velocity of the electrons in the beam is made substantially equal to the effective velocity of the radio-frequency signal wave traveling along the line. The electron beam is velocity-modulated by the electrostatic field developed by the signal wave traveling along the line, and, in turn, induces current in the line to amplify the radio-frequency signal.

In any traveling-wave tube, it is essential that the electron stream be confined to a relatively narrow path so that the electrons will not be collected by the wave-transmission line. A magnetic field extending throughout the length of the electron beam path is generally employed to confine the electrons to that path and to prevent dispersion of the beam; a relatively bulky and expensive electromagnetic coil surrounding the entire traveling-wave tube is usually utilized for this purpose. However, such a structure is not desirable in a television receiver or the like, where space and cost considerations are of paramount importance.

It is a primary object of the invention, therefore, to provide a new and improved electron-discharge device suitable for use as an amplifier over a relatively wide range of ultra-high frequencies.

It is a further object of the invention to provide an electron-discharge device, capable of operating as a broad band U. H. F. amplifier, which is relatively small in size but which provides an acceptable degree of signal amplification.

It is a specific object of the invention to provide a new and improved electron-discharge device of the velocity-modulated traveling-wave type in which the electron stream is effectively confined to a predetermined path without requiring the use of a magnetic collimating system.

It is a corollary object of the invention to provide a velocity-modulated traveling-wave tube which is relatively simple and expedient to construct and economical to manufacture.

An electron-discharge device of the velocity-modulated traveling-wave type, constructed in accordance with the invention, comprises an electron gun for projecting a stream of electrons along a reference path. The device includes a wave-transmission line, at least a portion of which encompasses the reference path and is electrostatically coupled to the electron beam. The wave-transmission line has a low wave-propagation velocity in a direction parallel to the reference path and has a length in that direction which is large in relation to the effective wavelength of a signal wave traveling along the line. The device also includes means for establishing an electrostatic lens field constituting a series of electrostatic lenses periodically disposed along the reference path to confine the beam to that path throughout the length of the wave-transmission line, this means including the encompassing portion of the wave-transmission line. The electrostatic lenses have a statial period substantially larger than the spacing between adjacent turns of the helical conductive winding which forms at least a part of the transmission line.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like reference numerals refer to like elements in the several figures, and in which:

Figure 1 is a cross-sectional view, partially schematic, of an electron-discharge device and includes a schematic representation of a simplified amplifier circuit;

Figure 1*a* is an explanatory diagram illustrating certain operational features of the device of Figure 1;

Figure 1:
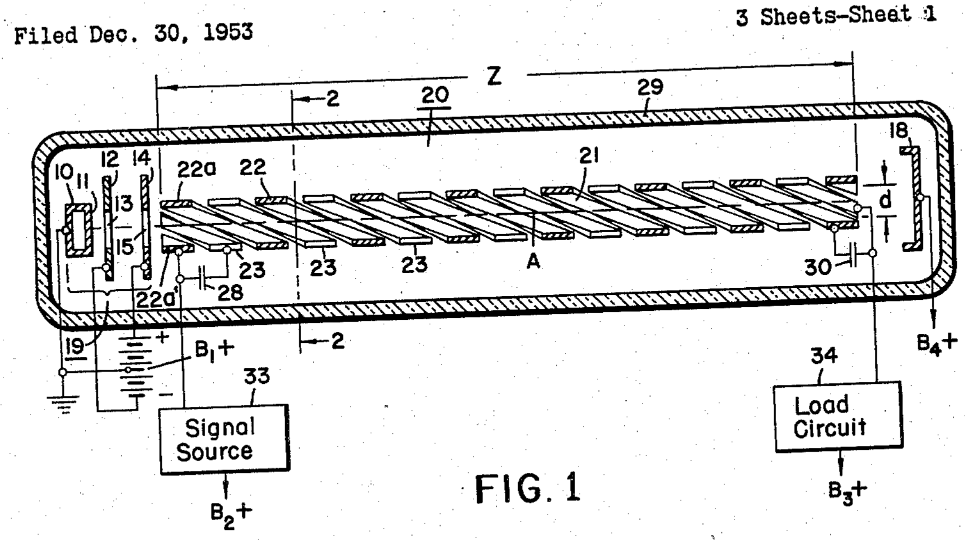

The apparatus shown in the cross-sectional partially schematic view of Figure 1 comprises an electron-discharge device or traveling wave tube 20; tube 20 includes a cathode 10 having an electron-emissive surface 11. A focusing electrode 12 is mounted in parallel spaced relation to surface 11 and includes a centrally located aperture 13. An accelerator electrode 14, which has a central aperture 15, is included in device 20 and is positioned adjacent focusing electrode 12. Cathode 10 and electrodes 12 and 14 comprise an electron gun 19 for projecting an electron beam along a reference path generally indicated by a dash line A comprising the center plane of the path; reference path A terminates at a collector electrode 18 positioned at the opposite end of tube 20.

Preferably, the electron beam developed by gun 19 is sheet-like in form; in other words, the electron beam has one principal cross-sectional dimension which is very much greater than a second principal cross-sectional dimension. For the illustrated structure, the lengths of electrodes 10, 12, 14 and 18, taken in a direction perpendicular to the plane of the drawing of Figure 1, are very much greater than the widths of apertures 13 and 15, so that the electron beam is of generally rectangular cross-sectional configuration and has a thickness very much smaller than its height. It should be noted that the invention to be described may be advantageously employed in structures which do not utilize a ribbon or sheet beam; however, a beam of this type is normally quite advantageous in a weak-signal amplifier, due to the fact that it permits realization of increased amplification from a tube of given maximum dimensions.

A wave-transmission line 21 is disposed intermediate electrode 14 and collector 18 and adjacent reference path A. Transmission line 21 comprises a first helical conductor 22 and a second helical conductor 23 which are wound in bifilar fashion; preferably, the central axes of the two helical windings coincide with reference path center plane A. The two sides of each individual turn of helices 22 and 23 are directly opposite each other and the windings progress only along one side; thus, elements 22*a* and 22*a'* are directly connected to each other to form a single helix turn. The individual turns of winding 22 are cross-hatched in the drawing, whereas the turns of winding 23, although also shown in cross section, are unshaded in order to distinguish the individual elements of the two windings from each other. It should be understood that the size of the windings has been exaggerated in Figure 1 and in succeeding figures in order to facilitate the presentation of the basic concept, and that only a relatively few turns of each winding are illustrated as compared to the number which may be actually employed.

Windings 22 and 23 of line 21 are electrically intercoupled for radio frequencies at the end of the line adjacent electron gun 19 by means of a capacitor 28; capacitor 28 is shown mounted within the envelope 29 of tube 20. If preferred, the electrical coupling between the two windings may be made externally to envelope 29. At the other end of line 21, adjacent collector 18, windings 22 and 23 are again electrically intercoupled by means of a capacitor 30. Capacitors 28 and 30 constitute effective short circuits at the input signal frequency while isolating the bifilar windings from each other with respect to D. C. or average potential.

Tube 20 may be provided with a suitable base for envelope 29 and an indirect heater element may be included in cathode 10; because these constructional details are familiar in the art, they are not illustrated in the drawings. Envelope 29 may be of conventional receiver-tube size. After wave-transmission line 21, collector 18, and the electrodes comprising electron gun 19 have been mounted within envelope 29, the envelope is evacuated and gettered in any manner known in the art.

A simplified external circuit for tube 20 has been schematically illustrated in Figure 1 in order to facilitate the description of the operation of the tube. A signal source 33 is connected to winding 22 of line 21. Of course, signal source 33 is also electrically coupled to winding 23 through capacitor 28; however, there is no direct conductive connection between the signal source and the latter winding. Source 33 may comprise any suitable source of radio-frequency signals, and may, for instance, constitute the termination of a television receiver antenna. A load circuit 34 is connected to winding 23 and is coupled to winding 22 through capacitor 20.

Cathode 10 is connected to a source of reference potential, here illustrated as ground. Accelerator 14 is connected to the positive terminal of a first source of unidirectional operating potential, here shown as a battery $B_1+$, and electrode 12 is connected to the negative terminal of source $B_1+$, an intermediate point in the battery being grounded. A second source of unidirectional potential, $B_2+$, is connected to signal source 33 to provide a preselected positive steady-state potential for winding 22. Similarly, a third D. C. voltage source $B_3+$ is connected to load circuit 34 to apply a positive D. C. voltage to transmission-line winding 23. Collector 18 is electrically connected to an additional source of positive potential, $B_4+$. It will be understood, of course, that all of the B+ voltage sources may comprise separate taps on a single unidirectional or D. C. voltage source. Furthermore, some of the B+ potentials (e. g. $B_1+$ and $B_4+$) may be of the same value.

Figure 2:
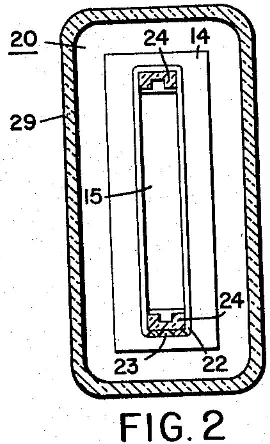
Figure 2 is a cross-sectional view taken along line 2—2 in Figure 1.

As seen in the cross-sectional view of Figure 2, the thickness of the electron beam is very much smaller than its height, so that the beam has a cross-sectional configuration corresponding to an elongated rectangle. It should be understood that although a rectangular cross-sectional configuration has been illustrated, any desired beam configuration may be employed. Windings 22 and 23 of transmission line 21 may be mounted upon a pair of insulating support posts 24; posts 24 have been omitted in Figure 1 in order to avoid confusing the drawing.

Referring again to Figure 1, when device 20 is placed in operation a radio-frequency signal is applied to wave-transmission line 21 from source 33. Due to the helical configuration of the windings which form the wave-transmission line, line 21 has a wave-propagation velocity in a direction parallel to reference path A which is considerably smaller than the propagation velocity of electromagnetic radiation in free space. The actual wave-propagation velocity of the line is a matter of design choice and may be as low as one one-hundredths (0.01) of the free-space propagation velocity. Electrons emitted from source 11 of cathode 10 are focused by passing through aperture 13 of electrode 12 and are then accelerated as they traverse opening 15 of accelerator 14, due to the operating potentials applied to these electrodes from source $B_1+$. Electrode 12 may also be employed to limit the total beam current, depending upon the negative potential of the focusing electrode with respect to cathode 10. Preferably, the average potentials supplied to the windings of line 21 should be different from that applied to electrode 14 from source $B_2+$, so that an electrostatic focusing lens is formed between electrode 14 and the adjacent edges of transmission line winding 22. The electrons of the beam continue along reference path A and are collected by electrode 18. The average beam velocity is determined by the average of the potentials of windings 22 and 23 with respect to cathode 10.

The velocity of the electron beam along path A is adjusted so that it is approximately equal to the wave-propagation velocity of the signal wave traveling along transmission line 21. Each electron instantaneously emerging into the portion of reference path A defined by transmission line length Z is subjected to an electric field established by the application of radio-frequency signals from source 33 to the transmission line. Because the electron and wave-propagation velocities are equal, each individual electron is continuously accelerated or decelerated along path A. Accordingly, as the electrons move along the reference path, they tend to become bunched, and, as the stream continues toward collector 18, it imparts energy to the traveling signal field. A proper choice of the design characteristics and operating voltages makes it possible to operate device 20 as an exponential amplifier; for a discussion of the mechanics of traveling-wave tubes in general, reference may be made to the book "Traveling-Wave Tubes" by J. R. Pierce, published by D. Van Nostrand Co., Inc., New York, 1950.

Operation of the amplifier of Figures 1 and 2 under the conditions just described might be highly successful if the electrons projected from emissive surface 11 of cathode 10 all followed paths exactly parallel to reference path A and if space-charge effects could be ignored. In practice, however, this is not possible. On the average, each of the electrons emerging from electron gun 19 has some initial transverse velocity which causes the beam to disperse and, in addition, space-charge effects tend further to spread the beam. These effects are even more severe when it is attempted to employ low beam velocity in order to obtain more gain over a shorter tube length. Consequently, if no provisions are made for holding the electron beam together as it traverses transmission line length Z, it is extremely difficult to secure useful gain from traveling-wave tube 20, since the electron beam rapidly disperses and is collected by the wave-transmission line. Furthermore, the amplifier exhibits poor noise characteristics if even as much as two percent of the electron beam is collected by the wave-transmission line. Conventionally, magnetic collimating fields have been employed to restrict the transverse excursions of the beam electrons; the structures employed to develop the magnetic collimating field, however, are considered excessively bulky and expensive for domestic television receivers and similar applications.

Traveling-wave tube 20, on the other hand, includes an electrostatic focusing structure for confining the electron beam within maximum permissible width $d$ of reference path A; the maximum beam width must be at least somewhat smaller than the spacing between the sides of transmission line windings 22 and 23. The bifilar construction of transmission line 21 and the capacitive coupling utilized between the individual helical windings at each end of the line makes it possible to establish windings 22 and 23 at substantially different operating or average potentials.

Figure 1$a$ illustrates the static conditions prevailing along a portion of reference path A. As indicated therein, the D. C. potential applied to the elements of winding 22 is substantially higher than that of winding 23. An electron entering the portion of reference path A bounded by the wave-transmission line may have a velocity component in the transverse direction indicated by arrows $y$ as well as a principal velocity component parallel to reference path center plane A. The transverse velocity of the electron may result from thermal or space-charge effects or other factors. For example, the electron may enter the interaction space bounded by windings 22 and 23 along a hypothetical path A′, and, at the outset, is subjected to a potential primarily determined by the D. C. voltage applied to winding elements 22$a$ from source $B_2+$. As the electron continues along path A′, it reaches the space between elements 22$a$ and 23$a$ of the helical windings. Because element 23$a$ is maintained at a considerably reduced potential with respect to element 22$a$, the electron encounters a convergent electron lens which tends to deflect the electron toward reference path center plane A. The electron continues its movement along path A′, and, upon reaching the space bounded by turns 23$a$ and 22$b$, enters another electrostatic lens and is again directed toward center plane A. Thus, as the electron proceeds along path A′ it is subjected to a periodic lens field effectively constituting a series of convergent electron lenses. The periodic lens field tends to deflect the electron toward center path A and effectively confines the electron beam with the maximum permissible width $d$. A second hypothetical path A″ illustrates the motion of an electron which enters the path from a different angle of approach. It will be understood that the relative sizes and spacings of the elements illustrated in Figure 1$a$ have been distorted somewhat to assist in explaining the figure and to provide more space for the illustrated electron paths. The relative potentials between windings 22 and 23 may be adjusted so that the electrostatic lenses formed between individual turns confine virtually all of the electrons within path width $d$.

To avoid difficulties presented by aberrations in the electron lenses, the spacing $s$ between adjacent lenses, defined as the spatial period, should be greater than three times the maximum permissible width $d$ of reference path A (the proportions illustrated in Figures 1 and 1$a$ have been altered to avoid overcrowding). Furthermore, transmission line length Z (Figure 1) must be large in relation to the effective wavelength of the signal as it travels along the wave-transmission line; this latter condition must be met in order to achieve appreciable gain. These conditions apply to the embodiments of the invention illustrated in Figures 3–10 as well as to the device described in connection with Figures 1–2.

Because the electrostatic lenses confine the beam within width $d$ so that it does not impinge upon the wave-transmission line, it is possible to make line 21 sufficiently long to achieve useful gain from tube 20 without engendering serious noise problems. The electrostatic lens field centers the beam about center plane A, as contrasted to the mere collimating action of a conventional magnetic field, so that width $d$ may be held to a minimum to provide for close coupling between the beam and the wave-transmission line. Moreover, the size of the resulting structure is considerably smaller and its weight is considerably less than a device in which conventional magnetic beam-confining means are employed.

The device illustrated in Figures 1 and 2 comprises a traveling-wave tube which operates to velocity-modulate the electron beam. A periodic electrostatic lens structure may also be employed advantageously in devices in which the electron beam is modulated in the transverse direction indicated by arrows $y$ of Figure 1$a$; transverse-mode tubes of the latter type are described and claimed in the copending applications of Robert Adler entitled "Traveling-Wave Amplifiers," Serial No. 394,797, and "Traveling-Wave Devices," Serial No. 394,798, now Patent No. 2,809,320; both of these applications were filed on November 27, 1953 and are assigned to the same assignee as the present invention.

Figure 3:
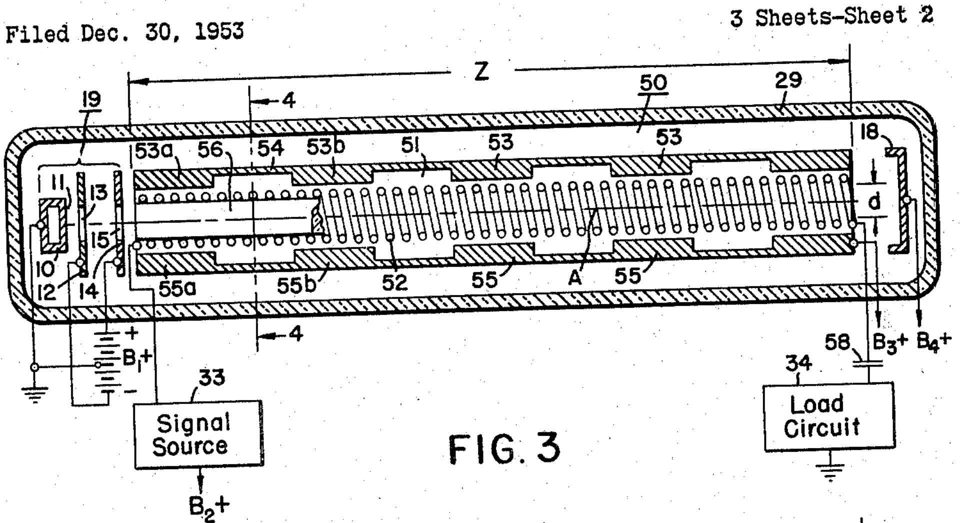
Figure 3 represents one embodiment of the invention, as seen in cross-section, a portion of the structure being illustrated schematically.

Figure 3 illustrates an embodiment of the invention which is in many respects similar to the tube shown in Figures 1 and 2. The embodiment of Figure 3 comprises an electron-discharge device 50 including an envelope 29 and an electron gun 19 mounted at one end of the envelope. A collector electrode 18 is mounted at the end of envelope 29 opposite electron gun 19. As in the device of Figure 1, gun 19 comprises a cathode 10, a focusing electrode 12, and an accelerator 14; an electron beam is projected from cathode surface 11 through electrode apertures 13 and 15 along a reference path designated by center plane A to impinge upon collector 18. The external connections for the individual electrodes of gun 19 and for collector 18 may be the same as in the device of Figure 1.

Tube 50 further includes a low-velocity wave-transmission line 51 which encompasses a portion of reference path A intermediate gun 19 and collector 18. Transmission line 51 comprises a helical conductive winding 52 which surrounds reference path A; preferably, the center plane of the winding corresponds to the center plane of the reference path. Line 51 further includes a plurality of lens elements or plates 53 periodically disposed along the outside of helix 52 and parallel to path A; lens elements 53 are electrically interconnected by a continuous metallic plate 54 which may be formed integrally with the lens elements. A further plurality of conductive plates 55 are periodically disposed along the outside of helix 52 directly opposite lens elements 53 and are also electrically connected to each other. Helical winding 52 is electrically connected to signal source 33 and to D. C. potential source $B_2+$ at the end of the helix adjacent electron gun 19, whereas the other end of the winding is coupled through a condenser 58 to load circuit 34. Conductive plates 53 and 55 on the other hand, are connected to unidirectional positive potential source $B_3+$.

Figure 4:
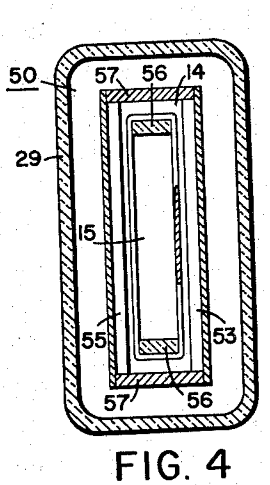
Figure 4 is a cross-sectional view taken along line 4—4 in Figure 3.

As indicated in the cross-sectional view of Figure 4, helix 52 may be wound upon a pair of dielectric support members 56. Moreover, the structures comprising conductive plates 53 and 55 may be interconnected by a pair of conductive support members 57. As in the previously-described device, the central opening of helix 52 and the electron beam projected through that opening are preferably of elongated rectangular cross-sectional configuration, the thickness of the beam being substantially smaller than its height.

When the tube illustrated in Figures 3 and 4 is placed in operation, the electrons emitted from cathode 10 are focused and accelerated by electrodes 12 and 14 and continue along path A toward collector 18. The potential applied to backing plates 53 and 55 from source $B_3+$ is made substantially higher than the positive potential applied to winding 52 from source $B_2+$. Consequently, as the electrons enter the portion of path A bounded by plates *53a* and *55a*, they are subjected to a potential which is determined by the effective penetration through winding 52 of the potential applied to the backing plates, in a manner analogous to the effect of the anode potential of a triode upon the electrostatic field existing between the grid and cathode of the triode.

The electrons of the beam continue along path A, and, upon reaching the end of the space bounded by backing plates *53a* and *55a*, enter an electron lens which tends to deflect the electrons toward the center plane of the path. This electron lens results from the electrostatic field developed at the ends of the backing plates, where the effect of the higher D. C. potential applied to the backing plate structure is effectively minimized due to the fact that the interconnecting elements 54 between the backing plates are separated from helical winding 52 by a much greater distance than the backing plates themselves. As the electrons continue along path A, they again enter a region constituting a convergent electron lens developed at the leading edges of the backing plates *53b* and *55b*. Thus, as the electrons of the beam follow along path A, they are subjected to a periodic electrostatic lens field which effectively forms a series of electron lenses throughout the length of transmission line 51. As in the tube of Figures 1 and 2, the electron lenses confine the beam to maximum permissible width *d*.

Figure 5:
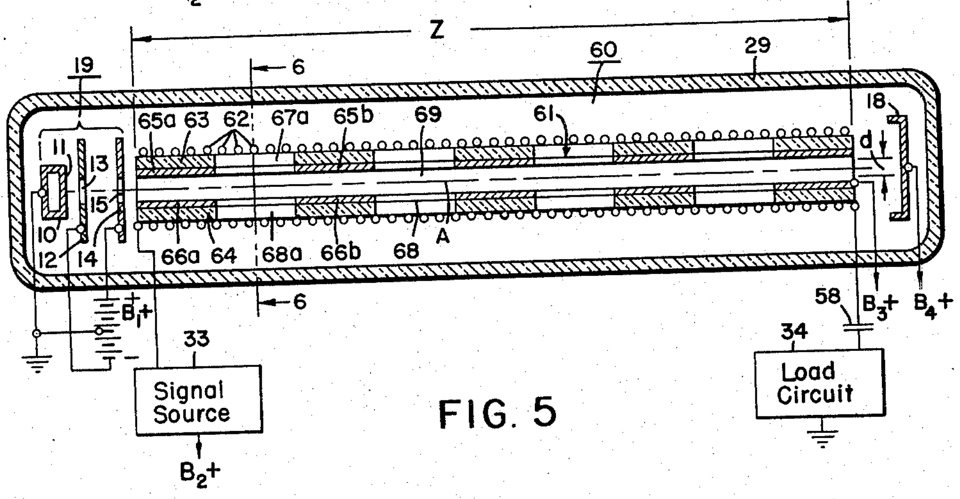
Figure 5 shows another embodiment of the invention with a portion of the device and its associated circuitry illustrated schematically.
Figure 8:
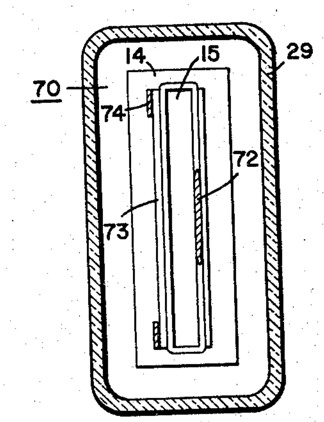
Figure 8 is a view taken along line 8—8 in Figure 7.

The embodiment of the invention illustrated in Figure 5 comprises a traveling-wave tube 60 including an envelope 29 and an electron gun 19 and collector 18 mounted at opposite ends of the envelope. Gun 19 and collector 18 may be essentially the same as in the previously-described embodiments and the electrical connections to the individual electrodes may also be made in the same way.

Tube 60 also includes a low-velocity wave-transmission line 61 mounted intermediate gun 19 and collector 18. Transmission line 61 comprises a helical winding 62 which encompasses a portion of the reference path A extending between gun 19 and collector 18. Line 61 further includes a pair of thin dielectric support members 63 and 64 positioned within helix 62 on opposite sides of reference path A; a series of conductive coatings 65 and 66 are periodically disposed along support members 63 and 64 respectively and are located directly opposite each other. The portions of support member 63 intermediate coatings 65 are cut away to form a series of openings or apertures 67; a similar series of openings 68 are formed between conductive coatings 66.

Figure 6:
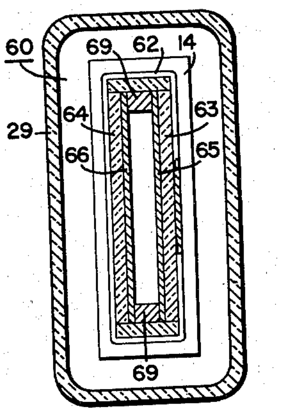
Figure 6 is a cross-sectional view of the traveling wave tube of Figure 5, taken along line 6—6 therein.
Figure 1A:
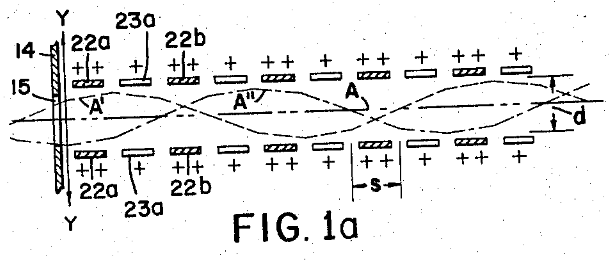

As indicated in Figure 6, conductive coatings 65 and 66 are electrically connected to each other by a pair of support members 69 so that the individual conductive coatings may be maintained at the same operating potential. Moreover, each series of conductive coatings are interconnected across openings 67 and 68. Conductive coatings 65 and 66 are highly resistive so that they cannot form an equipotential plane along the transmission line at radio frequencies. Thus, the radio-frequency field developed by the signal wave traveling along winding 62 penetrates coatings 65 and 66 and is coupled to the electron beam, while the D. C. potential to which the beam is subjected while traversing the space between the coatings is determined solely by source $B_3+$. As indicated in Figure 5, the electron gun and collector ends of helix 62 are individually coupled to signal source 33 and load circuit 34 respectively; helix 62 is also connected to bias potential source $B_2+$ at the electron gun end. Conductive coatings 65 and 66 are connected to D. C. potential source $B_3+$.

When tube 60 is placed in operation, the potentials applied to helix 62 from source $B_2+$ and to coatings 65 and 66 from source $B_3+$ are made are made substantially different from each other. Consequently, the electrons of the beam, as they follow path A, encounter a convergent electron lens at the edge of openings *67a* and *68a* adjacent coatings *65a* and *66a*. Moreover, as the electrons continue along the reference path they are again deflected toward center plane A of the reference path as they enter the region adjacent the leading edges of coatings *65b* and *66b*. Thus, the electron beam is subjected to a series of electron lenses formed adjacent to the edges of conductive coatings or lens elements 65 and 66. However, the radio-frequency field developed by the signal applied to winding 62 from source 33 is not substantially shielded from the beam by insulators 63, 64 nor by conductive coatings 65, 66, because of the high resistance of these coatings, so that the signal to be amplified is coupled to the beam throughout the length of line 61. The series of electron lenses formed by line 61 confine the beam to maximum width *d* of the reference path throughout the length of the wave-transmission line.

Figure 7:
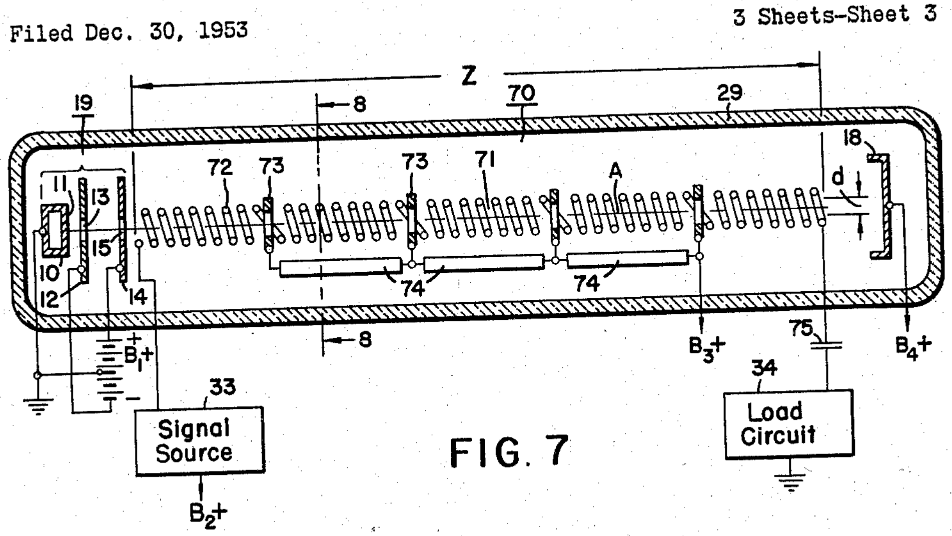
Figure 7 is a cross-sectional partially schematic view of an additional embodiment of the invention.

The embodiment of the invention illustrated in Figure 7 comprises a traveling-wave tube 70 of the velocity-modulation type which may include an electron gun 19 for projecting a stream of electrons along a reference path A to a collector electrode 18. The electrical circuit connections for the individual electrodes of gun 19 and collector 18 may be the same as in the previously-described embodiments.

Tube 70 also includes a wave-transmission line 71 which comprises a helical conductive winding 72 interposed between electron gun 19 and collector 18 in encompassing relation to reference path A. The end of winding 72 adjacent gun 19 is electrically connected to signal source 33 and to operating potential source $B_2+$; the other end of winding 72 is coupled through a condenser 75 to load circuit 34. Transmission line 71 further includes a plurality of apertured lens elements or electrodes 73 periodically disposed along reference path A and interposed between selected turns of winding 72. Lens electrodes 73 are electrically interconnected and are connected to a source of operating potential $B_3+$. The interconnection between lens electrode 73 may be effected by means of a pair of conductive connecting elements 74, as illustrated in the cross sectional view of Figure 8.

When tube 70 is placed in operation, lens electrodes 73 are established at a potential substantially different from the average or steady-state potential applied to winding 72 from source $B_2+$. Consequently, each of the lens electrodes, in conjunction with the adjacent portions of winding 72, comprises a unipotential lens for directing the electrons of the stream toward reference path center plane A. Thus, in this embodiment, as in the devices shown in Figures 1–6, the electron beam developed in gun 19 is subjected to a periodic electrostatic lens field as it traverses length Z of the wave-transmission line. This periodic lens field or series of electron lenses is employed to confine the electron beam within maximum permissible beam width *d* so that effective gain may be realized from tube 70 without engendering excessive noise problems. As in the previously-discussed devices, the radio-frequency signal applied to helix 72 from source 33 interacts with the electron beam to provide an amplified signal which is in turn applied to load circuit 34. In the preceding description of device 70, it was assumed that connecting elements 74 were simple metallic conductors. Lens electrodes 73 constitute small lumped capacities which are added at regularly spaced locations to helix 72, thus producing the transmission characteristics of a low-pass filter. It may be preferred to avoid or reduce the capacitive loading caused by the lens electrodes. For this purpose, connecting elements 74 may be constructed to be capable of transmitting the applied D.-C. or average potential $B_3+$ but to separate lens electrodes 73 from each other with respect to the signal frequency. Such connecting elements may comprise resistive material, or may comprise wound conductors having sufficient inductance to act as chokes.

Figure 9:
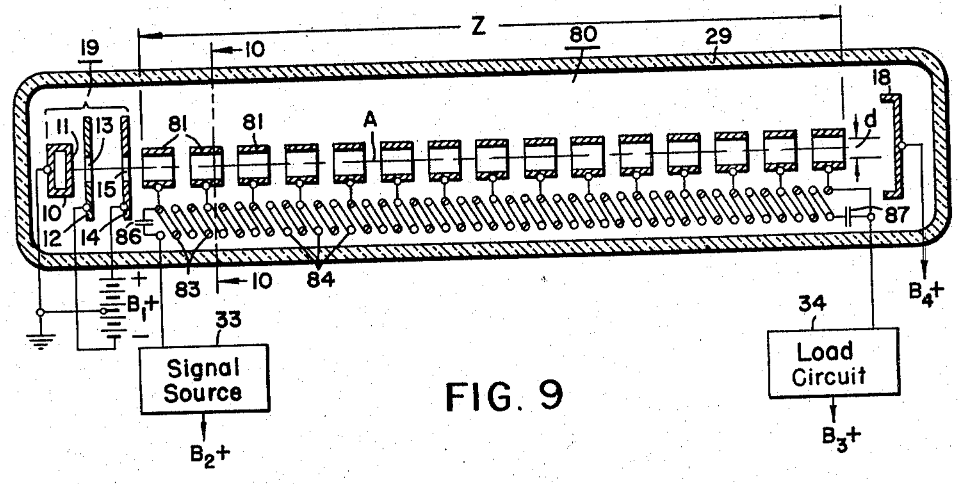
Figure 9 shows yet another embodiment of the invention in cross section, a portion of the apparatus being illustrated schematically.

The electron-discharge device 80 illustrated in Figure 9 comprises yet another embodiment of the invention. Tube 80 includes an envelope 29 and an electron gun 19 mounted at one end of the envelope to project a beam of electrons along a reference path A toward a collector electrode 18 mounted at the opposite end of the envelope. The individual electrodes of gun 19 may correspond to those of the previously described embodiments; the electrical circuit connections for those electrodes and collector 18 may be the same.

Tube 80 includes a series of hollow conductive elements 81 periodically disposed along reference path A in encompassing relation thereto. A first helical conductive winding 83 is included within tube 80; preselected turns of the conductive winding are electrically connected to alternate ones of the conductive lens elements 81. A second helical winding 84 is included within the tube and preselected points on this winding are connected to the remaining ones of lens elements 81. The two helical windings are shown as wound in bifilar fashion in the drawing. However, this particular structural form is not essential and structurally separate individual windings may be employed.

Figure 10:
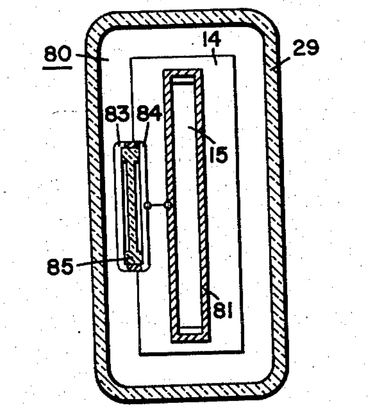
Figure 10 is a cross-sectional view along line 10—10 in Figure 9.

As indicated in Figure 10, helical windings 83 and 84 may be wound upon a common dielectric support member 85 which may be made of I-shaped cross sectional configuration to reduce stray capacitance along the line. As indicated in this figure, conductive lens elements 81 may be of essentially rectangular cross-sectional configuration with their height substantially greater than their width to provide close coupling to a sheet-like beam of electrons.

In Figure 9, the individual elements of winding 83 are cross hatched in the drawing whereas the elements of winding 84, although also shown in cross section, are unshaded in order to distinguish the two windings from each other. At the electron gun end of the tube, windings 83 and 84 are electrically intercoupled, for radio-frequency signals only, by a capacitor 86; the two windings are similarly coupled together at the collector end of the tube by a capacitor 87. Winding 84 is conductively connected to source 33 and to operating potential source $B_2+$; capacitor 86, of course, couples the radio-frequency from source 33 to winding 83 but does not provide a conductive path for the D. C. potential supplied by source $B_2+$. Winding 83, on the other hand, is conductively connected to load circuit 34 and unidirectional potential source $B_3+$, whereas winding 84 is coupled to the load circuit for radio-frequency signals only.

When tube 80 is placed in operation, the steady-state potentials applied to windings 83 and 84 are adjusted so that there is a substantial potential difference between the two conductive windings. Consequently, because adjacent ones of lens elements 81 are connected to different windings, the same D. C. potential difference is established between each lens element and the immediate adjacent lens elements. Thus, a series of electron lenses are formed along that portion of reference path A which is encompassed by the lens elements. Moreover, lens elements 81 and helical windings 83, 84 together form a wave-transmission line having a wave-propagation velocity parallel to path A which is relatively low in comparison to the velocity of free-space radiation. The series of electron lenses formed along the effective length Z of the wave-transmission line confine the electron beam developed by gun 19 to maximum width *d* of the reference path. Amplification is achieved by interaction between the signal wave applied to lens elements 81 from windings 83 and 84 and the electron stream in a manner essentially similar to that of previously-described embodiments.

Each of the traveling-wave tube structures described in connection with the several figures of the drawings may be constructed to provide relatively constant amplification throughout a broad band of frequencies. The tubes do not require the bulky and heavy external magnetic structures utilized in prior art devices to form a magnetic collimating field for confining the electron beam to its desired path; consequently, tubes constructed in accordance with the invention may be made relatively small in size and are thus well suited for mounting in a domestic television receiver or similar device. Moreover, because the electrostatic lens systems of the invention effectively center the electron stream upon its center plane rather than merely collimating the electrons along paths parallel to such a plane, they are inherently more effective in restricting dispersion of the beam attributable to thermal and space-charge effects. The operating voltages required are relatively low and do not unduly burden the power supply of a television receiver. The transmission-line structures are relatively simple in form and may be readily constructed by known methods, so that the tubes are not overly expensive and may be manufactured on a mass-production basis.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. An electron-discharge device of the longitudinal-mode traveling-wave type comprising: an electron gun, including an electron emissive cathode, for projecting a beam of electrons along a reference path of predetermined maximum width; a wave-transmission line comprising a helical conductive winding and a plurality of lens elements periodically distributed along and encompassing said reference path, said wave-transmission line being electrostatically coupled to said electron beam and having a substantially uniform low wave-propagation velocity in a direction parallel to said reference path and further having a length in said direction which is large relative to the effective wavelength of a radio frequency signal wave traveling along said line; means for applying a radio frequency signal to said wave-transmission line to establish said traveling signal wave and thereby to provide a longitudinal electric signal field which propagates along said reference path at said low wave-propagation velocity; and means for maintaining said conductive winding and said lens elements at substantially different unidirectional potentials to establish a series of convergent electrostatic lenses along said reference path, with a spatial period substantially larger than the spacing between adjacent turns of said helical conductive winding, to substantially confine said electron beam within said reference path, whereby said electron beam interacts with said traveling signal wave to provide substantial reinforcement thereof.

2. An electron-discharge device in accordance with claim 1 in which said conductive lens elements are of a length, in said direction, which is substantially greater than the distance between adjacent turns of said helical conductive winding.

3. An electron-discharge device of the longitudinal mode traveling-wave comprising: an electron gun, including an electron emissive cathode, for projecting a sheet-like beam of electrons along a reference path of predetermined maximum width; a wave-transmission line comprising a helical conductive winding encompassing said reference path and a plurality of interconnected conductive plates periodically disposed along opposite sides of said reference path and individually of a length, in a direction parallel to said reference path, substantially greater than the distance between adjacent turns of said helical conductive winding, said wave-transmission line being electrostatically coupled to said electron beam and having a substantially uniform low wave-propagation velocity in said direction and further having a length in said direction which is large relative to the effective wavelength of a raido frequency signal wave traveling along said line; means for applying a radio frequency signal to said wave-transmission line to establish said traveling signal wave and thereby to provide a longitudinal electric signal field which propagates along said reference path at said low wave-propagation velocity; and means for maintaining said conductive winding and said interconnected conductive plates at substantially different average unidirectional potentials to establish a series of convergent electrostatic lenses along said reference path, with a spatial period substantially larger than the spacing between adjacent turns of said helical conductive winding, to substantially confine said electron beam within said reference path, whereby said electron beam interacts with said traveling signal wave to provide substantial reinforcement thereof.

4. An electron-discharge device of the longitudinal mode traveling-wave type comprising: an electron gun, including an electron emissive cathode, for projecting a sheet-like beam of electrons along a reference path of predetermined maximum width; a wave-transmission line comprising a helical conductive winding encompassing said reference path, a pair of relatively thin dielectric support members individually interposed between said reference path and opposite portions of said winding, and a plurality of electrically interconnected high-resistivity conductive coatings periodically disposed along said support members on the sides thereof adjacent said reference path and individually of a length, in a direction parallel to said reference path, which is substantially greater than the distance between adjacent turns of said helical conductive winding, said wave-transmission line being electrostatically coupled to said electron beam and having a substantially uniform low wave-propagation velocity in said direction and further having a length in said direction which is large relative to the effective wave length of a radio frequency signal wave traveling along said line; means for applying a radio-frequency signal to said wave-transmission line to establish said traveling signal wave and thereby to provide a longitudinal electric signal field which propagates along said reference path at said low wave-propagation velocity; and means for maintaining said conductive winding and said highly resistive conductive coatings at substantially different average unidirectional potentials to establish a series of convergent electrostatic lenses along said reference path, with a spatial period substantially larger than the spacing between adjacent turns of said helical conductive winding, to substantially confine said electron beam within said reference path, whereby said electron beam interacts with said traveling signal wave to provide substantial reinforcement thereof.

5. An electron-discharge device of the longitudinal mode traveling-wave type comprising: an electron gun, including an electron emissive cathode, for projecting a sheet-like electron beam along a reference path of predetermined maximum width; a wave-transmission line comprising a helical conductive winding encompassing said reference path and a plurality of relatively thin apertured lens electrodes periodically interspersed with said helical winding along and in encompassing relation to said path, said wave-transmission line being electrostatically coupled to said electron beam and having a substantially uniform low wave-propagation velocity in a direction parallel to said reference path and further having a length in said direction which is large relative to the effective wave length of a radio frequency signal wave traveling along said line; means for applying a radio frequency signal to said wave-transmission line to establish said traveling signal wave and thereby to provide a longitudinal electric signal field which propagates along said reference path at said low wave-propagation velocity; and means for maintaining said conductive winding and said lens electrodes at substantially different unidirectional potentials to establish a series of convergent electrostatic lenses along said reference path, with a spatial period substantially larger than the spacing between adjacent turns of said helical conductive winding, to substantially confine said electron beam within said reference path, which electron beam interacts with said traveling signal wave to provide substantial reinforcement thereof.

6. An electron-discharge device in accordance with claim 5 in which said relatively thin apertured lens electrodes are conductively interconnected by a series of high impedance connecting elements.

7. An electron-discharge device of the longitudinal mode traveling-wave type comprising: an electron gun, including an electron emissive cathode, for projecting a beam of electrons along a reference path of predetermined maximum width; a plurality of conductive lens elements, periodically disposed along and encompassing said reference path, electrostatically coupled to said electron beam; inductance means interconnecting alternate ones of said conductive lens elements to form a wave-transmission line electrostatically coupled to said beam and having a substantially uniform low wave-propagation velocity in a direction parallel to said reference path and further having a length in said direction which is large relative to the effective wave length of a radio frequency signal wave traveling along said line; means for applying a radio frequency signal to said wave-transmission line to establish said traveling signal wave and thereby to provide a longitudinal electric signal field which propagates along said reference path at said low wave-propagation velocity; and means for maintaining said inductive means and the remaining ones of said lens elements at substantially different average unidirectional potentials to establish a series of convergent electrostatic lenses along said reference path, with a spacing between adjacent lenses which is greater than three times said maximum width of said reference path, to substantially confine said electron beam within said reference path, whereby said electron beam interacts with said traveling signal wave to provide substantial reinforcement thereof.

8. An electron-discharge device of the longitudinal mode traveling-wave type comprising: an electron gun, including an electron emissive cathode, for projecting a beam of electrons along a reference path of predetermined maximum width; a plurality of conductive lens elements, periodically disposed along and encompassing said reference path, electrostatically coupled to said electron beam; inductance means, comprising a uniform helical conductive winding disposed adjacent said conductive lens elements in non-coupling relation with said electron beam, interconnecting alternate ones of said conductive lens elements to form a wave-transmission line electrostatically coupled to said beam and having a substantially uniform low wave-propagation velocity in a direction parallel to said reference path and further having a length in said direction which is large relative to the effective wave length of a radio frequency signal wave traveling along said line; means for applying a radio frequency signal to said wave-transmission line to establish said traveling signal wave and thereby to provide a longitudinal electric signal field which propagates along said reference path at said low wave-propagation velocity; and means for maintaining said inductive means and the remaining ones of said lens elements at substantially different average unidirectional potentials to establish a series of convergent electrostatic lenses along said reference path, with a spatial period substantially larger than the spacing between adjacent turns of said helical conductive winding, to substantially confine said electron beam within said reference path, whereby said electron beam interacts with said traveling wave to provide substantial reinforcement thereof.

9. An electron-discharge device of the longitudinal mode traveling-wave type comprising: an electron gun, including an electron emissive cathode, for projecting a beam of electrons along a reference path of predetermined maximum width; a plurality of conductive lens elements, periodically disposed along and encompassing said reference path, electrostatically coupled to said electron beam; a first helical conductive winding having preselected turns electrically connected to alternate ones of said conductive lens elements; a second helical conductive winding, electrically coupled to said first winding for radio frequencies only and having preselected turns electrically connected to the remaining ones of said conductive lens elements, said two windings and said conductive lens elements comprising a wave-transmission line electrostatically coupled to said electron beam and having a substantially uniform low wave-propagation velocity in a direction parallel to said reference path and further having a length in said direction which is large relative to the effective wave length of a radio frequency signal wave traveling along said line; means for applying a radio frequency signal to said wave-transmission line to establish said traveling signal wave and thereby to provide a longitudinal electric signal field which propagates along said reference path at said low wave-propagation velocity; and means for maintaining each of said conductive windings at substantially different average unidirectional potentials to establish a series of convergent electrostatic lenses along said reference path, with a spatial period substantially larger than the spacing between adjacent turns of said helical conductive windings, to substantially confine said electron beam within said reference path, whereby said electron beam interacts with said traveling signal wave to provide substantial reinforcement thereof.

10. An electron-discharge device of the longitudinal mode traveling-wave type comprising: an electron gun, including an electron emissive cathode, for projecting a beam of electrons along a reference path of predetermined maximum width; a plurality of conductive lens elements, periodically disposed along and encompassing said reference path, electrostatically coupled to said electron beam; a first helical conductive winding, disposed adjacent said conductive elements in non-coupling relation with said electron beam, having preselected turns electrically connected to alternate ones of said conductive lens elements; a second helical conductive winding, electrically coupled to said first winding for radio frequencies only, disposed adjacent said conductive lens elements in non-coupling relation with said electron beam and having preselected turns electrically connected to the remaining ones of said conductive lens elements, said two windings and said conductive lens elements comprising a wave-transmission line electrostatically coupled to said electron beam and having a substantially uniform low wave-propagation velocity in a direction parallel to said reference path and further having a length in said direction which is large relative to the effective wave length of a radio frequency signal wave traveling along said line; means for applying a radio frequency signal to said wave-transmission line to establish said traveling signal wave and thereby to provide a longitudinal electric signal field which propagates along said reference path at said low wave-propagation velocity; and means for maintaining each of said conductive windings at substantially different average unidirectional potentials to establish a series of convergent electrostatic lenses along said reference path, with a spatial period substantially larger than the spacing between adjacent turns of said helical conductive windings, to substantially confine said electron beam within said reference path, whereby said electron beam interacts with said traveling signal wave to provide substantial reinforcement thereof.

11. An electron-discharge device in accordance with claim 10 in which said first and second helical conductive windings are bifilar.

References Cited in the file of this patent

UNITED STATES PATENTS

| | | |
|---|---|---|
| 2,190,511 | Cage | Feb. 13, 1940 |
| 2,206,387 | Bruche | July 2, 1940 |
| 2,300,052 | Lindenblad | Oct. 27, 1942 |
| 2,489,082 | DeForest | Nov. 22, 1949 |
| 2,720,609 | Bruck et al. | Oct. 11, 1955 |
| 2,725,499 | Field | Nov. 29, 1955 |
| 2,760,102 | Field | Aug. 21, 1956 |